United States Patent
Winfree et al.

(10) Patent No.: US 6,439,503 B1
(45) Date of Patent: Aug. 27, 2002

(54) PULSE DETONATION CLUSTER ENGINE

(75) Inventors: Don D. Winfree, Keller; Louis G. Hunter, Jr.; Billy D. Couch, both of Fort Worth, all of TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/612,727

(22) Filed: Jul. 10, 2000

(51) Int. Cl.$^7$ .................................................. B64B 1/24
(52) U.S. Cl. ........................ 244/53 R; 60/247; 60/39.78
(58) Field of Search ................................ 60/247, 39.78; 244/53 R

(56) References Cited

U.S. PATENT DOCUMENTS

| | | | | |
|---|---|---|---|---|
| 2,515,644 A | * | 7/1950 | Goddard | 60/39.78 |
| 2,580,908 A | * | 1/1952 | Goddard | 60/39.78 |
| 5,473,885 A | | 12/1995 | Hunter, Jr. et al. | 60/204 |
| 5,513,489 A | * | 5/1996 | Bussing | 60/39.38 |
| 5,546,744 A | | 8/1996 | Winfree et al. | 60/247 |
| 5,557,926 A | | 9/1996 | Hunter, Jr. et al. | 60/247 |
| 5,579,633 A | | 12/1996 | Hunter, Jr, et. al. | 60/204 |
| 5,672,184 A | | 9/1997 | Hunter, Jr. | 48/77 |
| 5,937,635 A | | 8/1999 | Winfree et al. | 60/39.38 |

* cited by examiner

Primary Examiner—J. Woodrow Eldred

(74) Attorney, Agent, or Firm—Bracewell & Patterson, L.L.P.

(57) ABSTRACT

A pulse detonation cluster includes a cluster housing and a plurality of pulse detonation engines mounted within the housing. Each pulse detonation engine has an inner tubular housing rigidly and concentrically mounted within a cylindrical bore of an outer tubular housing. The inner housing has a plurality of inner housing ports, and the outer housing has a plurality of outer housing ports. A detonation chamber is formed in the annulus between the inner housing and the outer housing. An outer valve sleeve is rotatably mounted to the outer housing for selectively allowing air to enter the detonation chamber through the outer housing ports. A fuel delivery member is aligned with each inner housing port to deliver fuel to the detonation chamber through the inner housing ports. An inner sleeve is mounted to the inner housing to protect the fuel delivery members during detonation. The air and fuel mixture is detonated by several igniters located in the detonation chamber. The detonation creates a detonation wave that travels through an open downstream end of the detonation chamber, thereby creating thrust for the engine. When combined in the cluster housing, outer valve sleeves of the pulse detonation engines are rotated by a common gear, which allows the engines to be easily timed to share inlet air entering the cluster housing. A pulse detonation bank is a combination of two or more pulse detonation clusters within a bank housing having a bank inlet. All of the pulse detonation engines within the bank share the bank inlet and are timed to maximize consumption of inlet air.

17 Claims, 3 Drawing Sheets

PULSE DETONATION CLUSTER ENGINE

BACKGROUND OF THE INVENTION

1. Field of the Invention

This invention relates in general to engines and in particular to a cluster of intermittent detonation engines driven by a common gear in which the detonation products are used as the thrust producing medium.

2. Description of Related Art

A pulse detonation engine is an apparatus which produces a high pressure exhaust from a series of repetitive detonations within a detonation chamber. A fuel is detonated within the chamber, causing a wave which propagates at supersonic speeds. The speeds could approach or exceed Chapman Jouguet detonation velocities. The wave compresses the fluid within the chamber, increasing its pressure, density, and temperature. As the wave passes out an open rearward end of the detonation chamber, thrust is created. The cycle is then repeated.

At high speeds, such as Mach 2 to about Mach 3.5, such an engine would be theoretically more efficient than conventional turbojets because the engine does not require compressors or turbines. A pulse detonation engine supplying the same amount or more of thrust as a conventional gas turbine engine would theoretically weigh less. Although a pulse detonation engine weighs less than gas turbine engines producing the same amount of thrust, there is always a desire to increase the thrust to weight ratio of any engine.

Pulse detonation engines have the advantage of not having stall problems as do gas turbine engines. Gas turbine engines develop separation in and around the compressor blades when loaded up, which leads to stall and unstart problems. Clusters of gas turbine engines also have the problem where one stalled engine will also create stall in the other engines. On the other hand, pulse detonation engines are totally isolated in terms of inlet interactions from engine to engine.

BRIEF SUMMARY OF THE INVENTION

A pulse detonation cluster according to the present invention eliminates inlet unstart occurrences and increases the thrust to weight ratio of a group of engines. The pulse detonation cluster includes a cluster housing and several pulse detonation engines disposed within the housing. The cluster housing has a common inlet that is shared by the pulse detonation engines.

Each pulse detonation engine includes an outer tubular housing having a cylindrical bore and a plurality of outer housing ports. An inner tubular housing having a cylindrical bore and plurality of inner housing ports is rigidly and concentrically connected within the outer tubular housing. A detonation chamber is formed in the annulus between the inner and outer housings, the detonation chamber having an upstream end wall and an open downstream end.

An outer valve sleeve having a plurality of outer sleeve ports is concentrically and rotatably mounted to an interior of the outer housing, the outer sleeve ports aligning with the outer housing ports when the outer valve sleeve is in an open position and not aligning with the outer housing ports when the outer valve sleeve is in a closed position.

A plurality of fuel delivery members for delivering fuel to the detonation chamber are rigidly disposed in the inner tubular housing, each fuel delivery member aligning with one of the inner housing ports. An inner sleeve having a plurality of inner sleeve ports is concentrically and rotatably carried on an exterior of the inner housing. The inner sleeve rotates about a longitudinal axis of the inner tubular housing and has an open position and a closed position, the inner sleeve ports aligning with the inner housing ports when the inner sleeve is in the open position and blocking the inner housing ports when the inner sleeve is in the closed position.

A plurality of radial spars are rigidly connected between the outer valve sleeve and the inner sleeve. The radial spars insure that both the outer sleeve and the inner sleeve will rotate together at the same angular velocity.

An external drive system is used to rotate a common gear which matingly engages the outer valve sleeve of each pulse detonation engine in the cluster housing. Since the opening and closing of all the outer valve sleeves are controlled by the common gear, the engines can be easily timed and coordinated to share inlet air from the common inlet of the cluster housing. When properly timed, a pulse detonation cluster having four pulse detonation engines will run smoothly and will have very little bypass air.

A bank of engines includes a bank housing and two or more pulse detonation clusters. By combining two clusters within a bank housing having a common inlet, the eight pulse detonation engines (four in each cluster) can be properly timed to consume all of the air entering the inlet of the bank housing.

DETAILED DESCRIPTION OF THE PREFERRED EMBODIMENT

Figure 1:
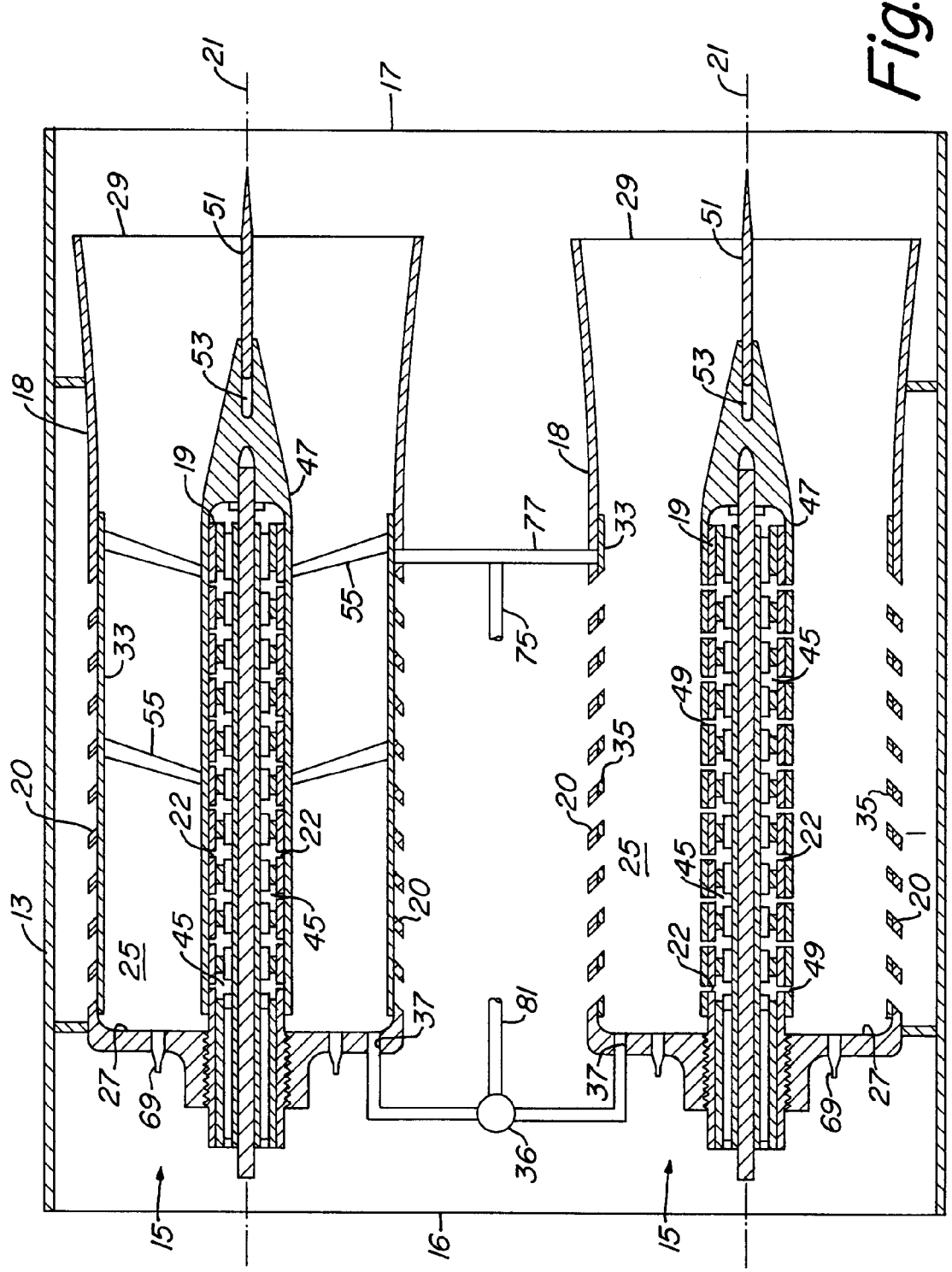
FIG. 1 is a cross-sectional side view of a pulse detonation cluster having four pulse detonation engines driven by a common gear according to the present invention.
Figure 2:
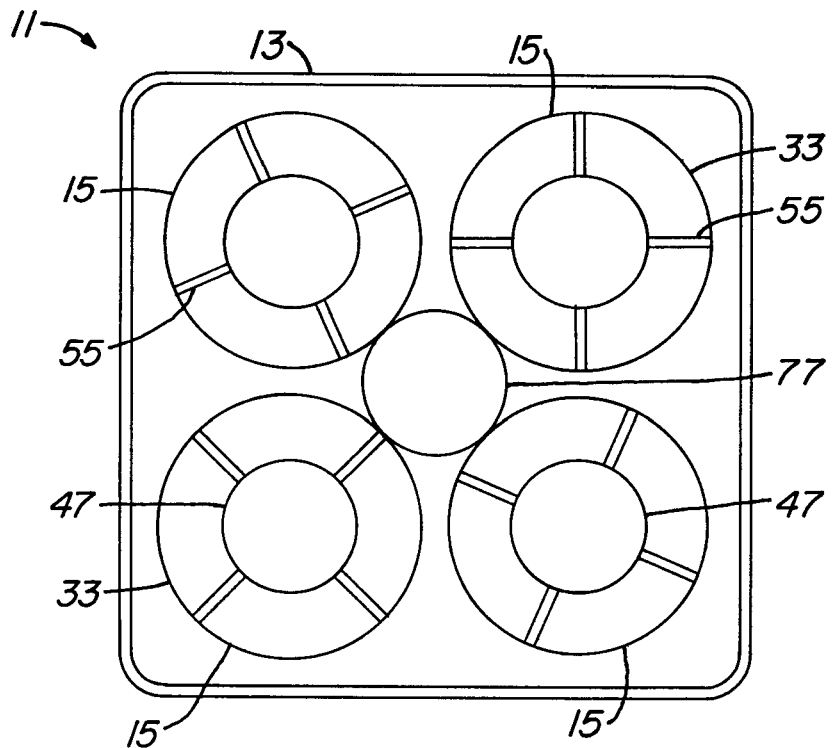
FIG. 2 is a schematic front view of the pulse detonation cluster of FIG. 1.

Referring to FIGS. 1 and 2, a pulse detonation cluster 11 according to the present invention is illustrated. Pulse detonation cluster 11 can be used to propel aircraft, spacecraft, missiles, rockets, and other subsonic and supersonic vehicles. Pulse detonation cluster 11 includes a cluster housing 13 with four pulse detonation engines 15 mounted within the cluster housing 13. Cluster housing 13 includes a cluster inlet 16 and a cluster outlet 17, the cluster inlet 16 receiving inlet air to help power the pulse detonation engines 15, the cluster outlet 17 allowing exhaust from the pulse detonation engines 15 to exit the cluster housing 13.

Pulse detonation engines 15 can be any engine that provides thrust with intermittent detonations that result in a series of detonation waves. In the preferred embodiment, each pulse detonation engine 15 includes an outer tubular housing 18 and an inner tubular housing 19. Outer tubular housing 18 has a plurality of outer housing ports 20 and a cylindrical bore with a longitudinal axis 21. Inner tubular housing 19 is rigidly connected to outer tubular housing: 18 within the bore, concentric with longitudinal axis 21. Inner tubular housing 19 includes a plurality of inner housing ports 22 and a cylindrical bore with a longitudinal axis coaxial to axis 21.

The location of inner tubular housing 19 within the bore of outer tubular housing 18 forms an annular detonation chamber 25. The detonation chamber 25 has an upstream end wall 27 that is an integral part of outer tubular housing 18. The detonation chamber has an open downstream end 29.

An outer valve sleeve 33 is concentrically and rotatably mounted on an interior of the outer tubular housing 18. Outer valve sleeve 33 includes a plurality of outer sleeve ports 35 for registering with the outer housing ports 20 when outer valve sleeve 33 is in an open position (see lower pulse detonation engine 15 in FIG. 1). The outer sleeve ports 35 do not align with outer housing ports 20 when outer valve sleeve 33 is in a closed position (see upper pulse detonation engine 15 in FIG. 1).

When the outer valve sleeve 33 is in the open position, the outer sleeve ports 35 and outer housing ports 20 allow air and/or oxygen to enter the detonation chamber 25. The outer sleeve ports 35 and the outer housing ports 20 are angled toward the upstream end wall 27 as the ports extend radially outward. The angled characteristic of each port 20, 35 boosts the air and/or oxygen delivery to the detonation chamber 25 as inlet air flows past the exterior of outer tubular housing 18.

In some instances, air may be used as the sole oxidizing agent. In other instances, pure oxygen or oxygen-rich air may be injected into detonation chamber 25 by an oxygen supply valve 36 fluidly connected to an external oxygen tank (not shown). Oxygen is supplied by the valve 36 to oxygen ports 37 disposed in the upstream end wall 27. A higher concentration of oxygen near the upstream end wall 27, which is where ignition takes place, aids in the ignition of a fuel mixture.

Outer sleeve ports 35 and outer housing ports 20 are arranged in four axial groups, each group being parallel to the longitudinal axis 21 and being circumferentially disposed 90 degrees apart from the adjacent groups. The exact number of axial groups land the angular displacement of those groups could vary depending on the specific design of the pulse detonation engine 15. Since engine 15 has four axial groups, the outer valve sleeve 33 opens outer housing ports 20 four times during each revolution of the valve sleeve 33.

A plurality of fuel delivery members 45 are rigidly connected to the inner tubular housing 19 within the bore of the housing 19. Each fuel delivery member 45 is aligned with one of the inner housing ports 22 to provide fuel to the detonation chamber 25. If liquid fuel is used with pulse detonation engine 15, then fuel delivery members 45 are fuel injectors which regulate the atomization and injection of liquid fuel into the detonation chamber 25. Liquid fuel is atomized to approximately four microns before being injected into detonation chamber 25. If gaseous fuel is used with pulse detonation engine 15, fuel delivery members 45 are solenoid valves that regulate the injection of gaseous fuel into detonation chamber 25.

An inner sleeve 47 is concentrically and rotatably disposed on an exterior of the inner tubular housing 19. Inner sleeve 47 includes a plurality of inner sleeve ports 49 for registering with the inner housing ports 22. The primary function of inner sleeve 47 is to protect the fuel delivery members 45 during detonation. As previously mentioned, the fuel delivery members 47 actually control the entry of liquid or gaseous fuel into the detonation chamber 25, thereby performing a valving function. The inner sleeve 47 covers the fuel delivery members 47 during detonation to prevent contact with the hot products of detonation.

A cylindrical guide member 51 is rigidly connected to the outer tubular housing 18 near open downstream end 29, the guide member 51 being concentric with longitudinal axis 21 and being supported by cooled struts (not shown) that are disposed between guide member 51 and outer tubular housing 18. Inner sleeve 47 has a channel 53 located at one end for receiving guide member 51. Guide member 51 adds stability to the inner sleeve 47 during its rotation about longitudinal axis 21.

A plurality of radial spars 55 are rigidly connected between outer valve sleeve 33 and inner sleeve 47. The radial spars 55 insure that both the outer sleeve 33 and inner sleeve 47 will rotate together at the same angular velocity.

Detonation of a fuel mixture is performed by igniters 69, which may be either spark-type or lasers. At least two igniters 69 are disposed in the upstream end wall 27 of the detonation chamber 25. It is preferred to have at least four igniters 69 in the detonation chamber 25, each igniter spaced 90 degrees apart. Only two of the four igniters 69 are illustrated in the pulse detonation engines 15 of FIG. 1. Detonation could also be performed by injecting a preliminary detonation wave to begin the main detonation.

In operation, the movements of outer valve sleeve 33 and inner sleeve 47 and the operation of fuel delivery members 45 for each pulse detonation engine 15 are timed to coordinate the injection of air and fuel into detonation chamber 25. During a normal cycle of each engine 15, the outer valve sleeve 33 opens, thus aligning outer sleeve ports 35 with outer housing ports 20. As outer valve sleeve 33 opens, air enters and purges the detonation chamber 25 of any unwanted gases or products. The inner sleeve 47 opens at the same time or just after the opening of the outer sleeve 33, thus aligning inner sleeve ports 49 with inner housing ports 22. After the initial purging process, fuel is delivered by the fuel delivery members 45 through inner housing ports 22. As the fuel enters the detonation chamber and mixes with the air, a fuel mixture is formed.

Outer valve sleeve 33 closes so that outer sleeve ports 35 and outer housing ports 20 are no longer aligned. At the same time, the inner sleeve 47 closes, thereby covering the fuel delivery members 45. The fuel mixture is detonated by igniters 69. As the fuel mixture detonates, a detonation wave is formed that moves at five to seven thousand feet per second relative to the stationary reactants in front of the wave. The detonation wave is a high temperature, high pressure, detonation wave which discharges out open downstream end 29, creating thrust. A reverberating expansion wave is created by the initial detonation wave. The expansion wave reflects off the upstream end wall 27 and discharges from the open downstream end 29, creating additional thrust. The closure of outer valve sleeve 33 and inner sleeve 47 prevents hot products and hot metal from coming into contact with fuel or oxygen that has not yet been introduced into the detonation chamber 25.

After detonation, outer valve sleeve 33 and inner sleeve 47 move again into the open position. The purging process takes place as air flows through the outer housing ports 20 and into the detonation chamber 25. The entire cycle of fuel injection and detonation is repeated following the purging process. The rotational speed of outer valve sleeve 33 and inner sleeve 47 are selected to create pulses at a rate of approximately 100 cycles per second.

In the preferred embodiment, the pulse detonation engine 15 described above is combined with three other pulse detonation engines in housing 13 to form the pulse detonation cluster 11. The outer valve sleeves 33 and inner sleeves 47 are powered by an external drive system that includes a drive shaft 75. The external drive system supplies power through drive shaft 75 to a common gear 77 that is matingly connected to the outer valve sleeves 33 of all four pulse detonation engines 15. As common gear 77 turns, the outer valve sleeves 33 and inner sleeves 47 turn simultaneously.

The same external drive system is operably connected to a drive shaft 81 that is connected to oxygen supply valve 36. In the event that an external oxygen system (tank and fluid lines not shown) is used, the link between the external drive system and the oxygen supply valve 36 allow precise synchronization of the rotating valve sleeves 33, 47 and the injection of oxygen to the detonation chamber 25.

Although the preferred cluster 11 uses rotating inner sleeves 47 and rotating outer valve sleeves 33, pulse detonation engines with translating inner and outer sleeves (not shown) could be used. Translating sleeves would oscillate linearly back and forth along longitudinal axis 21 between an open position and a closed position. Like the rotating sleeves 33, 47, the translating inner and outer sleeves of all the pulse detonation engines would be driven by a common drive system so that their movement was synchronous.

As previously discussed, within each pulse detonation engine 15, the inner sleeve 47 is timed and coordinated with the outer valve sleeve 33 and the fuel delivery members 45 to properly admit and detonate the fuel mixture within the detonation chamber 25. Similarly, the outer valve sleeves 33 of all four engines 15 in the pulse detonation cluster 11 are timed relative to each other. The valve sleeves 33 are timed to maximize the consumption of inlet air entering inlet 16 of cluster housing 13, thereby creating a minimum amount of bypass air (air that does not enter the detonation chambers 25 of the engines 15). The radial location of outer sleeve ports 35 on any one of the outer valve sleeves is slightly different than that of the other valve sleeves. These radial offsets can be seen in FIG. 2, which shows the different radial positions of the radial spars 55. At any given time, at least one sleeve 33 of one of the engines 15 will be open or partially open. Each engine 15 will detonate at a different time. When properly timed, the pulse detonation cluster 11 will run smoothly and will have very little bypass air.

It is possible that additional or fewer pulse detonation engines 15 could be used in each pulse detonation cluster 11. The number of pulse detonation engines 15 in a cluster 11 could be increased by increasing the diameter of the common gear 77. As the number of engines 15 in a cluster 11 increases, the amount of bypass air exiting the cluster housing 13 generally decreases. Conversely, as the number of engines 15 decreases, the amount of bypass air generally increases.

The preferred embodiment of the pulse detonation cluster 11 includes four pulse detonation engines 15 surrounding the common gear 77. However, the use of four engines in a cluster 11 does produce some bypass air. Instead of adding additional engines 15 around the one common gear 77, it is preferable to combine multiple pulse detonation clusters into a pulse detonation bank.

Figure 3:
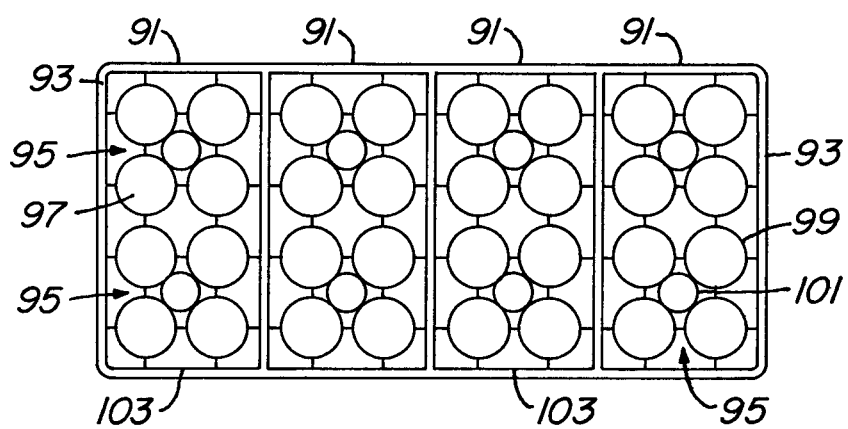
FIG. 3 is a schematic front view of four banks of engines, each bank having two of the pulse detonation clusters of FIG. 1.

Referring to FIG. 3, four pulse detonation banks 91 are illustrated. Each pulse detonation bank 91 includes a bank housing 93 and two pulse detonation clusters 95 (similar to pulse detonation cluster 11), each pulse detonation cluster 95 having four pulse detonation engines 97 (similar to pulse detonation engine 15). Each pulse detonation engine 97 includes an outer valve sleeve 99 (similar to outer valve sleeve 33) and an inner sleeve (not shown but similar to inner sleeve 47), the outer valve sleeve 99 and the inner sleeve being rotated by a common gear 101 (similar to common gear 77).

In the series of pulse detonation banks 91 shown in FIG. 3, the housing 93 of each bank 91 includes an inlet 103 and an outlet (not shown) and is integrally attached to the adjacent bank housings 93. Additionally, the housing (similar to 13) of each pulse detonation cluster 95 has been eliminated, with each pulse detonation engine 97 being mounted directly to the bank housings 13.

By combining two clusters 95 in each pulse detonation bank 91, the advantages of having eight pulse detonation engines 97 receiving air from the same inlet 103 are obtained. The pulse detonation engines 97 housed in each bank are timed so that i, at any given time of operation, at least one of the outer valve sleeves 99 in a bank 91 is at least partially opened. This is advantageous because no bypass air is created. Instead, all of the inlet air that enters inlet 103 is consumed by the pulse detonation engines 97. As the amount of bypass air is decreased, the pulse detonation bank 91 runs more smoothly and more efficiently.

Although it is possible to have a pulse detonation bank 91 with fewer than eight pulse detonation engines 97, eight is the fewest number of engines 97 that will consume all of the inlet air entering a common inlet 103. It is always possible to add more pulse detonation engines 97 to the engine bank 91, and the engines 97 can be arranged in any combination of pulse detonation clusters 95.

Figure 4:
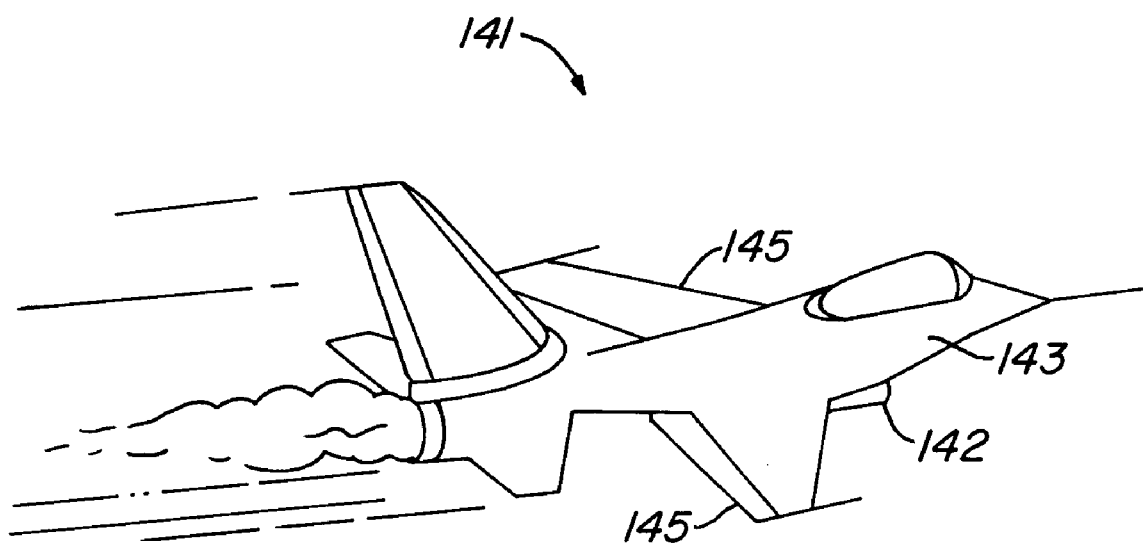
FIG. 4 illustrates a military airplane powered by the pulse detonation cluster of FIG. 1.

FIG. 4 illustrates a military airplane 141 that has pulse detonation clusters 142 as shown in FIGS. 1, 2, and 3. Airplane 141 has a fuselage 143 and wings 145.

One advantage of the present invention is that it allows multiple pulse detonation engines to use common inlets, common gearing, common drive systems, and common control systems. By integrating the use of these components, which are usually individually associated with each pulse detonation engine, the detonations among a group of engines can be timed and coordinated. For engines sharing a common inlet, such as the inlet of the cluster housing, precise timing of the engines enables better consumption of inlet air entering the cluster housing. Another result of the pulse detonation engines sharing components is that substantial weight reductions are realized, which enable a higher thrust to weight ratio for the propulsion system.

Still another advantage of the common gearing between the pulse detonation engines is the avoidance of inlet unstart conditions. Inlet unstart occurs at supersonic speeds when an engine stalls. For an engine having its own air induction inlet, an engine stall event at supersonic speeds causes a shock wave to form in front of the inlet. Due to separation pockets caused by the shock wave, sufficient quantities of air are no longer able to enter the inlet. Because of the insufficient air supply, the engine is not able to re-start. Inlet unstart conditions are very dangerous, and can result in loss of the aircraft and loss of human life. By providing a cluster of pulse detonation engines that share a common inlet, the problem of inlet unstart is avoided. If any one of the engines in a pulse detonation cluster stops detonating, the other engines in that cluster will continue to consume enough inlet air to avoid the formation of a shock wave in front of the cluster inlet.

It should be apparent from the foregoing that an invention having significant advantages has been provided. While the invention is shown in only one of its forms, it is not just limited but is susceptible to various changes and modifications without departing from the spirit thereof.

We claim:

1. An aircraft having wings and a fuselage comprising:
   a pulse detonation cluster having a cluster housing and a plurality of pulse detonation engines mounted within the cluster housing, each engine having a detonation chamber and at least one valve for admitting air to the detonation chamber, the pulse detonation cluster also having a common drive member driven by an external drive system, the common drive member simultaneously moving the valves of the pulse detonation engines;

a fuel injection system carried by the aircraft for delivering fuel to each of the detonation chambers to create a combustible fuel mixture for detonation in the detonation chamber; and a pulse detonation bank, each bank having a bank housing with a common inlet and at least two of the pulse detonation clusters, the pulse detonation clusters receiving air from the common inlet of the bank housing.

2. An aircraft having wings and a fuselage comprising:

a pulse detonation cluster having a cluster housing and a plurality of pulse detonation engines mounted within the cluster housing, each engine having a detonation chamber and at least one valve for admitting air to the detonation chamber, the pulse detonation cluster also having a common drive member driven by an external drive system, the common drive member simultaneously moving the valves of the pulse detonation engines;

a fuel injection system carried by the aircraft for delivering fuel to each of the detonation chambers to create a combustible fuel mixture for detonation in the detonation chamber;

each pulse detonation engine also includes a tubular housing having a longitudinal axis, the valve of each engine being a valve sleeve mounted concentrically and rotatably to the tubular housing; and the common drive member being a gear that matingly engages each of the valve sleeves for simultaneously rotating the valve sleeves about the longitudinal axes of the tubular housings.

3. An aircraft having wings and a fuselage comprising:

a pulse detonation cluster having a cluster housing and a plurality of pulse detonation engines mounted within the cluster housing, each engine having a detonation chamber and at least one valve for admitting air to the detonation chamber, the pulse detonation cluster also having a common drive member driven by an external drive system, the common drive member simultaneously moving the valves of the pulse detonation engines;

a fuel injection system carried by the aircraft for delivering fuel to each of the detonation chambers to create a combustible fuel mixture for detonation in the detonation chamber;

each of the pulse detonation engines comprises:

an outer tubular housing having a cylindrical bore and at least one outer housing port;

an inner tubular housing having a cylindrical bore and at least one inner housing port;

an outer sleeve movably carried by the outer tubular housing, the outer sleeve having at least one outer sleeve port for aligning with the outer housing port to intermittently open and close the outer housing port;

an inner sleeve movably carried by the inner tubular housing, the inner sleeve having at least one inner sleeve port for aligning with the inner housing port to intermittently open and close the inner housing port; wherein the detonation chamber being located within an annulus formed between the outer tubular housing and the inner tubular housing; and one of the sleeves being the valve for admitting air to the detonation chamber, the other of the sleeves allowing fuel to enter the detonation chamber.

4. The aircraft according to claim 3 wherein:

the outer sleeve of the pulse detonation engine is rotatably carried on an interior of the outer tubular housing;

the outer sleeve port aligns with the outer housing port at least once per revolution to open the outer housing port for allowing air to enter the detonation chamber;

the inner sleeve is rotatably carried on an exterior of the inner tubular housing; and the inner sleeve port aligns with the inner housing port at least once per revolution to open the inner housing port for allowing fuel to enter the detonation chamber.

5. The aircraft according to claim 4 wherein the common drive member comprises a gear operably connected to both the outer sleeve and inner sleeve of each pulse detonation engine for simultaneously rotating the outer sleeves and the inner sleeves of the engines.

6. The aircraft according to claim 1 wherein the detonation of the fuel mixture in the detonation chamber of each pulse detonation engine occurs at a different time than detonations in the other pulse detonation engines.

7. A pulse detonation cluster comprising:

a cluster housing;

a plurality of pulse detonation engines mounted within the cluster housing, each individual pulse detonation engine having a tubular housing that forms a detonation chamber and at least one rotatable valve sleeve in the tubular housing, the valve sleeve having at least one port in a cylindrical sidewall for admitting gas to the detonation chamber; and a common gear driven by an external drive system for simultaneously rotating the valve sleeves of the pulse detonation engines.

8. A pulse detonation cluster comprising:

a cluster housing;

a plurality of pulse detonation engines mounted within the cluster housing, each individual pulse detonation engine having a tubular housing that forms a detonation chamber and at least one rotatable valve sleeve for admitting air to the detonation chamber;

a common gear driven by an external drive system for simultaneously rotating the valve sleeves of the pulse detonation engines;

the tubular housing of each pulse detonation engine has a longitudinal axis, the valve sleeve of each engine being mounted concentrically and rotatably to the tubular housing; and the common gear matingly engages each of the valve sleeves for simultaneously rotating the valve sleeves about the longitudinal axes of the tubular housings.

9. A pulse detonation cluster comprising:

a cluster housing;

a plurality of pulse detonation engines mounted within the cluster housing, each individual pulse detonation engine having a tubular housing that forms a detonation chamber and at least one rotatable valve sleeve for admitting air to the detonation chamber;

a common gear driven by an external drive system for simultaneously rotating the valve sleeves of the pulse detonation engines;

the tubular housing of each pulse detonation engine comprises an outer tubular housing having a cylindrical bore and at least one outer housing port;

the valve sleeve comprises an outer sleeve movably carried by the outer tubular housing, the outer sleeve having at least one outer sleeve port for aligning with the outer housing port to intermittently open and close the outer housing port;

each of the pulse detonation engines further comprises:

an inner tubular housing having a cylindrical bore and at least one inner housing port, and an inner sleeve movably carried by the inner tubular housing, the inner sleeve having at least one inner sleeve port for aligning with the inner housing port to intermittently open and close the inner housing port; and wherein the detonation chamber is located within an annulus formed between the outer tubular housing and the inner tubular housing.

10. The pulse detonation cluster according to claim 9 wherein the outer sleeve and the inner sleeve rotate in unison.

11. The pulse detonation cluster according to claim 7 further comprising:

an oxygen system for supplying oxygen to selected areas of the detonation chambers;

and wherein the common gear is operably connected to the oxygen system to time the delivery of oxygen to the detonation chambers.

12. The pulse detonation cluster according to claim 7 wherein the cluster housing of the pulse detonation cluster has an inlet and an outlet, the pulse detonation engines receiving air that enters the inlet of the cluster housing.

13. A pulse detonation cluster comprising:

a cluster housing;

a plurality of pulse detonation engines mounted within the cluster housing, each individual pulse detonation engine having a tubular housing that forms a detonation chamber and at least one rotatable valve sleeve for admitting air to the detonation chamber;

a common gear driven by an external drive system for simultaneously rotating the valve sleeves of the pulse detonation engines; and the rotation of the valve sleeves is timed such that the flow of air entering the inlet of the cluster housing is constant.

14. The pulse detonation cluster according to claim 7 wherein:

the detonation chamber receives air and fuel to create a combustible fuel mixture for detonation in the detonation chamber; and the operation of the pulse detonation engines are timed such that each pulse detonation engine detonates at a different time than the other pulse detonation engines.

15. A method for propelling an aircraft comprising:

(a) providing a pulse detonation cluster having a cluster housing and a plurality of pulse detonation engines mounted within the cluster housing, each engine having a detonation chamber and at least one valve for admitting air to the detonation chamber, the pulse detonation cluster also having a common drive member driven by an external drive system, the common drive member being operably connected to the valves of the pulse detonation engines;

(b) simultaneously operating the valves of the pulse detonation engines with the common drive member;

(c) delivering fuel into each of the detonation chambers to create a combustible fuel mixture;

(d) igniting the fuel mixture to create a pulse detonation wave for propelling the aircraft;

step (b) further comprises:

providing each pulse detonation engine with an outer tubular housing having at least one outer housing port and an inner tubular housing having at least one inner housing port, the inner tubular housing mounted concentrically within the outer tubular housing;

providing an outer sleeve rotatably carried by the outer tubular housing, the outer sleeve having at least one outer sleeve port for aligning with the outer housing port in an open position and blocking the outer housing port in a closed position;

providing an inner sleeve rotatably carried by the inner tubular housing, the inner sleeve having at least one inner sleeve port for aligning with the inner housing port in an open position and blocking the inner housing port in a closed position, one of the sleeves being the valve for admitting air to the detonation chamber, the other of the sleeves allowing fuel to enter the detonation chamber;

rotating the inner sleeve and the outer sleeve simultaneously for each pulse detonation engine; and rotating the sleeves of all of the pulse detonation engines such that the detonation in each pulse detonation engine occurs at a different time than the detonations in the other engines.

16. An aircraft having wings and a fuselage comprising:

a pulse detonation cluster having a cluster housing and a plurality of pulse detonation engines mounted within the cluster housing, each engine having a detonation chamber;

at least one air valve for each of the engines for admitting air to the detonation chamber of each of the engines;

at least one fuel valve for each of the engines for admitting fuel into the detonation chamber; and a common drive member driven by an external drive system, the common drive member simultaneously moving the air and fuel valves of all of the pulse detonation engines.

17. The aircraft according to claim 16, further comprising:

an oxygen valve for the cluster for admitting substantially pure oxygen into the detonation chambers, the oxygen valve being commonly driven with the gas valve and the fuel valve.

* * * * *